R. REECE.
Improvement in Ice-Machines.
No. 131,783. Patented Oct. 1, 1872.

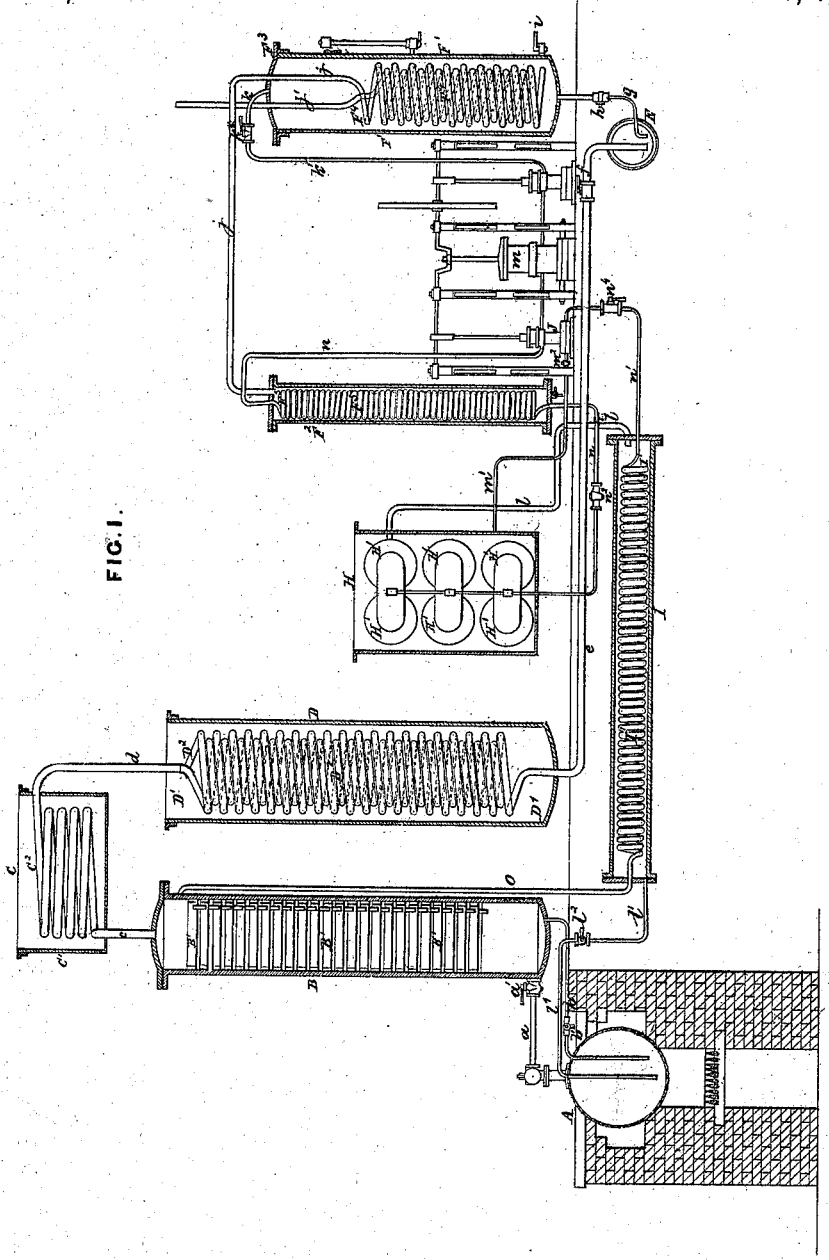

R. REECE.
Improvement in Ice-Machines.
No. 131,783. Patented Oct. 1, 1872.

UNITED STATES PATENT OFFICE.

REES REECE, OF LLANDILO, WALES.

IMPROVEMENT IN ICE-MACHINES.

Specification forming part of Letters Patent No. 131,783, dated October 1, 1872.

*To all whom it may concern:*

Be it known that I, REES REECE, of Llandilo, Wales, chemist, have invented certain improvements in apparatus for cooling and refrigerating liquids, manufacturing ice, and obtaining ammoniacal solution for the same, and other purposes, of which the following is a specification:

This invention relates to that class of refrigerating-machines which employ ammonia as a cold-producing agent, known as the Ronart and Mignon or Carré machines; and consists, mainly, in the combination of a cylinder and pumps for utilizing the gaseous ammonia as a motive power, and also in certain details of construction, as will be fully described hereinafter.

The first object of the said invention is the elimination of liquid ammonia in an anhydrous condition, or nearly so, from its aqueous solution in one continuous operation. For accomplishing this result I employ a generator, an analyzer, a rectifier, a liquefactor or condenser, and a receiver, all arranged as hereinafter described, and forming what I call the distillery part of my apparatus. The ammoniacal gas eliminated from its solution in water, by the action of the generator, analyzer, and rectifier, passes onward to the liquefactor, in which, by its own pressure, it is reduced to a liquid and collected in the receiver. The liquefied ammonia thus obtained is anhydrous, or nearly so. The liquid is now conducted into a vessel which I call a refrigerator, wherein is placed a coil of pipe, the liquid ammonia surrounding the coil on the outside. Any liquid passing through this coil will be cooled by the evaporation of the liquid ammonia surrounding it. The refrigerator is connected, by means of a cock, to another coil contained in another iron pipe, which coil extends to the absorbent-vessel, which is connected to the coil of piping contained in the refrigerator. The object of the second vessel and coil of the refrigerator is the exchange of temperature with the gas as it leaves the second vessel. In its passage onward to the absorbent-vessel the ammoniacal gas comes in contact with the spent or exhaust liquor of the distilling apparatus, in which it dissolves, yielding back the original quantity of the solution of ammonia, to be used over again repeatedly without appreciable loss or waste. This solution of ammonia is forced by a pump into the top of the analyzer, in which the ammonia is separated from the water. It then passes to the condenser to be liquefied, while the exhaust liquor passes to the generator, from which it passes into the temperature exchanger or heater, and thence to the absorber. The ammoniacal gas as it passes from the refrigerator to the absorbent-vessel has a considerable tension or elastic force, especially when the apparatus is used to cool water in breweries, and this force I employ as a motive power to drive the pumps of the apparatus, instead of using steam-power for that purpose, while the excess or surplus pressure may be utilized as a prime mover for other purposes.

Description of the Drawing.

Figure 1 is a sectional elevation of my improved apparatus, showing all the separate vessels of the same in their proper position for cooling or refrigerating purposes.

Like letters indicate the same parts throughout the drawing.

Figure 3:
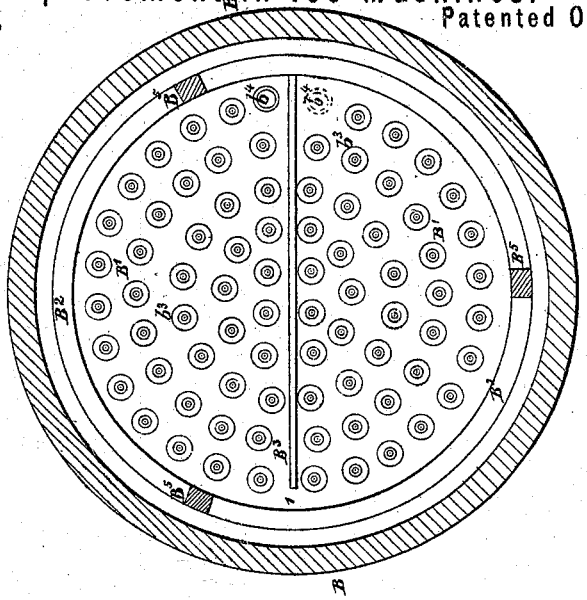
Fig. 3 is a horizontal section on the line $x\,x$, Fig. 2, showing a slight modification of the parts of the said analyzer. These two figures are drawn to an enlarged scale.
Figure 2:
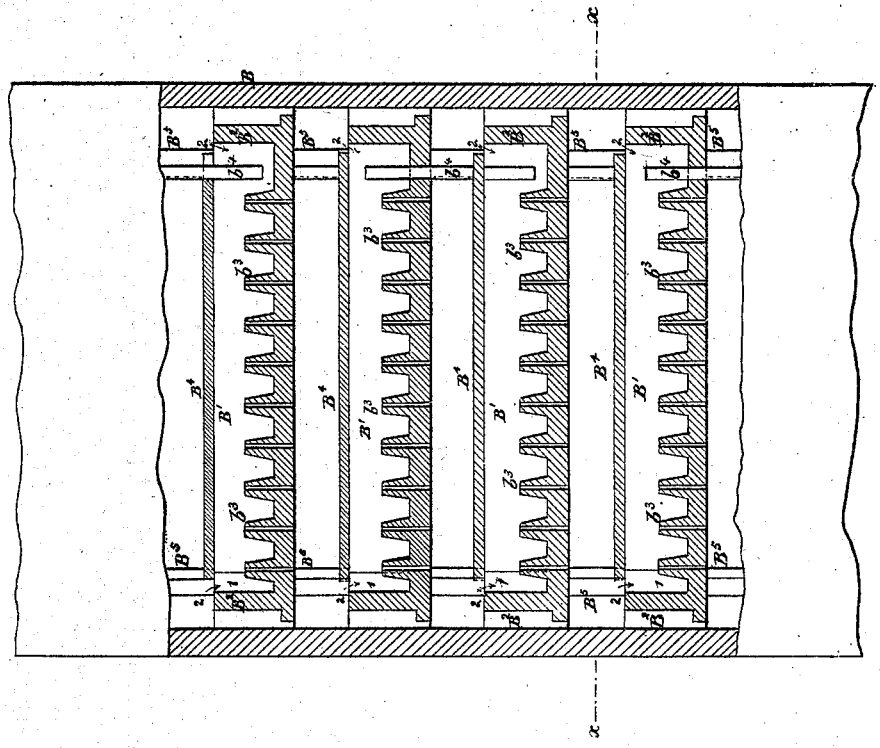
Fig. 2 is a vertical section of a portion of the aforesaid analyzer.
Figure 6:
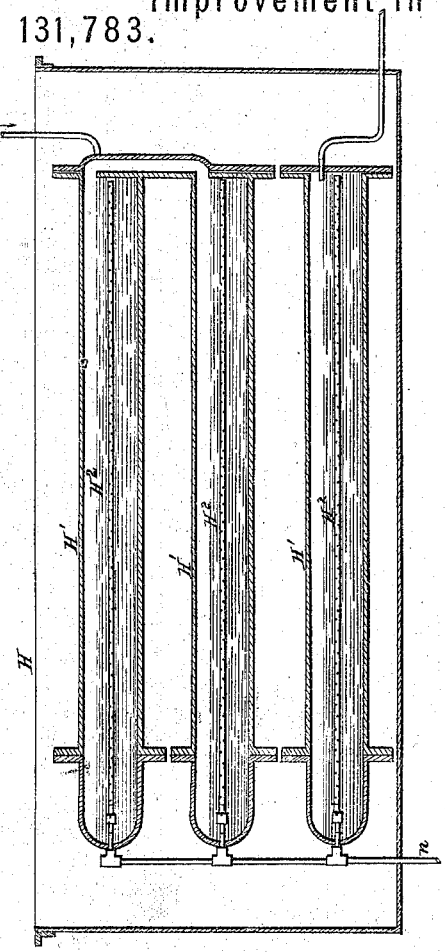
Figs. 4, 5, 6, and 7 are longitudinal, transverse, and horizontal sections of the absorbent-vessel.
Figure 7:
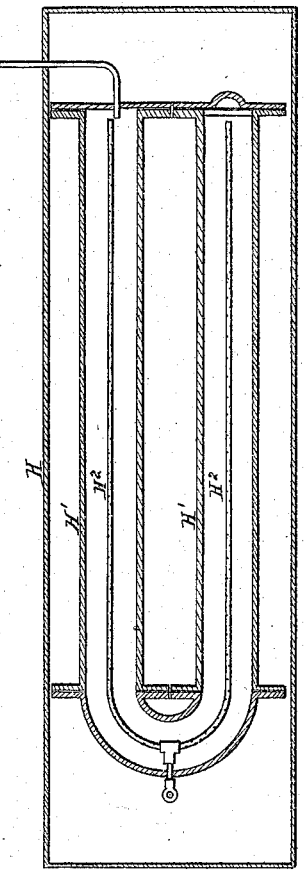
Figure 4:
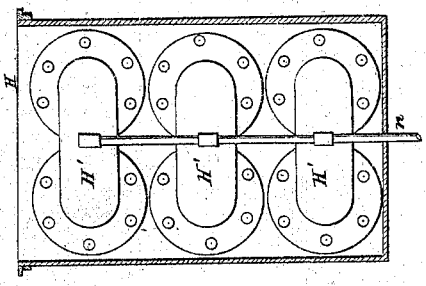
Figure 5:
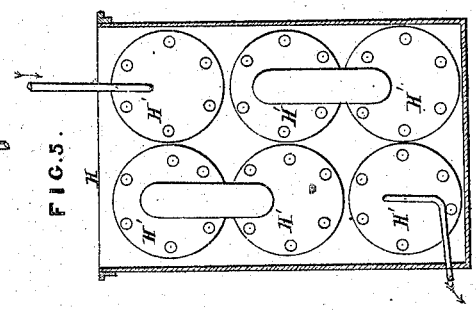

The generator A is an ordinary cylindrical or other shaped steam-boiler, made sufficiently strong to resist a working pressure of at least seventy atmospheres, and provided with pressure-gage, water-gage, and safety-valve. The said boiler is set in suitable brick-work, and is connected by the pipes $a\,b$ to the analyzer B, shown detached in Figs. 2 and 3. This analyzer consists of a cylindrical vessel of wrought or cast iron or steel, into which a number of dishes or cups, $B^1$, are fitted, distant one from the other about two to four inches. These dishes are made tight in the cylinder by cement, or gasket-joints, or other suitable packing. The said cups are of two kinds, as shown. They are formed of cast or wrought iron, of suitable diameter to fit properly in the cylinder B, with a ring or rim, $B^2$, about two inches deep, between which and the surface of the cylinder I leave a space sufficient to make a secure joint with the cement or packing. These dishes have formed or fixed upon them a number of small bosses or nozzles, $b^3$, about one-half inch deep. Each boss is perforated with a hole of about one-fourth inch diameter. They have also an overflow-pipe, $b^4$, about one-fourth of an inch higher than the top of the perforated bosses. This overflow-pipe passes through the dish nearly to the bottom of the next lower dish, so that the liquid may pass from one dish to the other through these overflow-pipes, while the steam passes through the perforations only. Each of the said dishes has a bar, $B^3$, extending nearly across it of the same depth as the outer ring $B^2$. A space, 1, is left at one end of this bar, so that the liquid may circulate over the entire surface of the dish. Upon each of these bars I secure a dead-plate, $B^4$, of a smaller diameter than the ring of the dish. This dead-plate is designed to prevent the direct passage of the steam through the cylinder. As the steam passes through the perforations in the nozzles it strikes against the bottom of the dead-plate passing up to the next dish through the annular space 2 between the dead-plate and outer ring. If desired, however, the dishes may be used in the analyzer without the dead-plate, as shown in Fig. 3. The said dishes are supported one upon the other and kept the proper distance apart by the distance pieces or rods $B^5$. The pipe $c$ at the top of the analyzer connects it to the rectifier C. The outer portion of this rectifier is a cistern, $C^1$, which contains a coiled wrought-iron pipe, $C^2$. This coil must have a sharp downward inclination or fall toward the analyzer. From the top of the rectifier a pipe, $d$, passes to the condenser or liquefactor D. The said liquefactor is constructed with a worm tub or cistern, $D^1$, which contains one or more coils of wrought-iron tubing, $D^2$. Each coil is made of one length of pipe. When two or more coils are used they are coiled one within the other and connected together by stubbed or calked joints. The upper coil is attached to the rectifier-pipe $d$, and the bottom coil terminates with a pipe, $e$, which is connected to a receiver, E. The latter is a wrought or cast iron vessel of any convenient shape. The above-described parts, which constitute the distilling part of the apparatus, must be proved to three hundred pounds pressure per square inch. In the pipe $e$, between the liquefactor and the receiver, a cock, $f$, is placed to prevent the escape of the liquid ammonia when the apparatus is not at work. A pipe, $g$, with a cock, $h$, connects the receiver E with the refrigerator. This refrigerator has two cylindrical vessels $F^1$ $F^2$, as shown in Fig. 1. The first vessel $F^1$ is the one in which the evaporation of the liquid ammonia takes place. This vessel is made of wrought or cast iron. It has a movable cover, $F^3$, and is provided with water and pressure gages, and has a cock, $i$, at the bottom. This vessel has in it a coil of wrought-iron piping extending from the bottom of the vessel about two-thirds of its height. When a length of piping exceeding one hundred and twenty feet is required I use two or more coils arranged one within the other. The said coils are connected to each other by stubbed or calked joints. The pipe $j$ from this coil connects it with the other vessel $F^2$. It passes through the cover $F^3$, as shown; and into this cover I insert a pipe, $k$, which is provided with a cock, $k^*$, from which a pipe, $k^1$, extends to the induction-aperture of an engine, which has a cylinder, $m$, and is provided with a slide-valve and the necessary admission and exhaust ports similar to those of a high-pressure steam-engine. The eduction-pipe $n$ is connected to the coil $F^5$ in the second vessel $F^2$. The pipe $j$ connects the open part of the vessel $F^2$ with the inlet of the coil $F^4$ in the vessel $F^1$. It will be observed that the vessel $F^2$ is of much smaller diameter than the first vessel $F^1$, and is in fact simply a flanged pipe, the coil $F^5$ extending from end to end of the same. The covers of these cylinders are made tight by cement or India rubber, or other suitable material. The outlet-pipe $j'$ of the coil in $F^1$ cylinder carries away the liquid refrigerated. It will be observed that the coil $F^5$ forms a continuation of the eduction-pipe $n$, and from the bottom of this coil the said eduction-pipe is extended to the absorber H. The said pipe is provided with a valve, $n^2$, as shown, between the coil and the absorber. The said absorber, which is shown in detail in Figs. 4, 5, 6, 7, has iron pipes $H^1$, preferably flanged, and of suitable diameter. These pipes are arranged in pairs horizontally superposed one over the other, and are so connected together as to form one continuous pipe. The pipes are kept from one-half to two-thirds full of liquid, as shown. In each of these pipes $H^1$ there is placed a small pipe, $H^2$, which extends nearly the whole length of the pipes $H^1$. These small pipes are closed at their inner extremity, and are immersed in the liquid contained in the pipes $H^1$. These small pipes are perforated with small holes throughout their whole length. The perforations are greatest in number at the inflow, the direction of which is indicated by the arrows, Figs. 5 and 6, and gradually diminish in number toward the outflow. These pipes are connected one to the other, as shown in Fig. 6, and are also connected to the eduction-pipe $n$ of the engine, as shown in Fig. 1. These absorbent-tubes are placed in a tank which is kept full of cold water. The absorber is provided with an air-cock. I prefer to have the pipes placed horizontally in pairs, as shown; but, if desired, their position may be varied in any convenient manner.

What I consider as essential to my invention is, that the pipes $H^1$ shall be so arranged as to retain permanently a considerable quantity of liquid in them, and that the small tubes $H^2$ shall be in such liquid. If desired, two or more of these small tubes may be placed in each pipe, so that numerous points of contact shall be presented. The object is the keeping of the gas and liquid in contact a sufficient length of time to allow the gas to dissolve freely in the liquid. The exhaust liquid as it enters the absorber has a specific gravity of about 0.988, and should have by the time it has made the circuit of the pipes to the outflow a specific gravity of about 0.900.

The absorbent-vessel H, besides its use in connection with my improved refrigerating apparatus, may be employed in the production of solution of ammonia for general commercial purposes. The absorbent-vessel may be made of glass or earthenware tubes instead of metal. The pipe $l$ passes from the absorbent-vessel H to another vessel, I, which I call the heater. This vessel consists of an iron flanged pipe, inclosing a coil, I', of wrought-iron piping; the said pipe $l$ enters the open part of the heater I. At the other end of the heater is a pipe, $l^1$, with a cock, $l^2$, which pipe is inserted through the top of the generator A, and extends down nearly to the bottom of the same. The outflow-pipe $m^1$ of the absorbent-vessel H, which is provided with a cock, $m^2$, is connected to a force-pump, J, and on the delivery side of the said pump is a pipe, $n^1$, with a valve, $n^4$, which pipe is connected to the coil I' in the heating-vessel I. This coil is connected, by another pipe, $o$, to the top of the analyzer B. At the bottom of the said analyzer is the cock $b'$ from which the pipe $b$ extends through the top of the generator nearly to the bottom of the same. The steam-pipe $a$ passing from the generator to the analyzer is also provided with a cock, $a'$. The coils in the heater I, the analyzer-cups B', and the generator A are charged with a solution of ammonia, and the absorber H and heater I are charged with a weaker solution of ammonia. A fire is lighted under the generator A, the steam-cock $a'$ of the pipe $a$ is opened, and the cock $b'$ of pipe $b$ is closed. The cock between the liquefactor or condenser D and receiver E, and also the cock between the receiver and refrigerator, are opened. The cock connecting the vessel $F^1$ to the vessel $F^2$ of the refrigerator is closed, and the cock on the bottom of the vessel $F^1$ of the refrigerator is opened, the whole of the air in the apparatus as far as this cock being blown out, and the said cock then closed. The cock between the refrigerator and receiver E is also closed. The fire being maintained under the generator A drives the ammonia gas forward through the rectifier (in which it is dehydrated by a regulated stream of cold water passing through its cistern) to the liquefactor D, where by its own pressure it is converted into a liquid, which is collected in the receiver E, the heat of the liquefactor being carried off by passing a stream of cold water through the liquefactor-cistern. The liquefied ammonia is conducted from the receiver E into the refrigerator until a sufficient quantity is obtained to immerse the coil in it; this liquid flows in from the receiver to the refrigerator in a continuous stream, which is regulated by the cock between them. The cocks on either side of the ammonia-pump are now opened. The cock in the pipe leading to the engine-cylinder is now gradually opened, and the liquid ammonia resumes its gaseous condition, and by its pressure drives the engine. The exhaust ammonia gas passing through the coil in the vessel $F^2$, and the small perforated pipes of the absorber into the liquid surrounding them, is dissolved, and the solution of ammonia so generated is forced by the pump through the coil I' of the heater I into the top of the analyzer B. The cock $b'$ in the pipe $b$, at the bottom of the said analyzer, is opened, and the cock $l^2$, between the generator A and the heater I, is also gradually opened to allow a regulated stream of liquor to pass out of the generator A into the heater I, and thence through the pipe $l$ into the absorbent-vessel H. The liquor passing out of the generator A exchanges temperatures with the liquor forced through the coil in the said heater on its way to the analyzer B. The cock $l^2$ between the generator and heater, as well as the cock between the vessels $F^1$ $F^2$ of the refrigerator, have to be adjusted so that the liquor coming from the generator into the absorber, and the gas passing from the refrigerator into the absorber, shall be in such proportion that the one dissolving in the other shall produce a strong solution of ammonia. During the working of the absorber H a considerable amount of heat is generated therein, which is removed by cold water passing through its cistern; thus the apparatus is worked in a continuous manner. Any liquid intended to be cooled or refrigerated is passed through the cock at the bottom of the vessel $F^2$ of the refrigerator, and thence through the coil in the vessel $F^1$, and forward by the outlet to any desired receptacle. This liquid may be forced by its own pressure or by a pump worked by the engine, and may be used either for the manufacture of ice, the cooling of water in breweries, and for cooling or refrigerating for various other purposes.

I do not claim broadly the idea of employing ammonia as a cold-producing agent, nor do I claim to be the first to use a generator, condenser, receiver, and refrigerator combined.

Claims.

1. The analyzer with the series of cups or dishes, having the perforations, dividing-plate, and overflow-pipe, and with or without the dead-plate, substantially as set forth, for the purpose specified.

2. The combination of the cylinder M with the pumps J, for utilizing the gaseous ammonia passing from the refrigerator to the absorber, as set forth.

3. The absorber described, consisting of the enlarged pipes $H^1$, adapted by means of their construction always to retain a certain quantity of liquid, in combination with the small perforated holes $H^2$ centrally located within the pipes $H^1$, as described.

4. The combination of the generator A, analyzer B, rectifier C, liquefactor D, receiver E, refrigerator $F^1$ $F^2$, absorber H, and heater I, all the parts being constructed and arranged as and for the purpose set forth.

REES REECE.

Witnesses:
W. J. LOWE,
GEORGE HASELTINE.